(12) United States Patent (10) Patent No.: US 9,241,021 B2
Subramanian (45) Date of Patent: ***Jan. 19, 2016

(54) REMOTE SUBSCRIPTION MANAGEMENT METHOD AND SYSTEM

(71) Applicant: NTV Internet Holdings, LLC, Buffalo, NY (US)

(72) Inventor: Anand Subramanian, New York, NY (US)

(73) Assignee: NTV Internet Holdings, LLC, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,975

(22) Filed: Jan. 9, 2015

(65) Prior Publication Data

US 2015/0195316 A1 Jul. 9, 2015

Related U.S. Application Data

(60) Continuation of application No. 14/318,209, filed on Jun. 27, 2014, now Pat. No. 8,938,543, which is a division of application No. 13/914,316, filed on Jun. 10, 2013, now Pat. No. 8,799,390.

(60) Provisional application No. 61/657,911, filed on Jun. 11, 2012.

(51) Int. Cl.
*G06F 15/173* (2006.01)
*H04L 29/06* (2006.01)
(Continued)

(52) U.S. Cl.
CPC ........ *H04L 65/4069* (2013.01); *H04L 41/0246* (2013.01); *H04L 65/60* (2013.01); *H04L 65/601* (2013.01); *H04N 21/2225* (2013.01); *H04N 21/234309* (2013.01); *H04N 21/2747* (2013.01);
(Continued)

(58) Field of Classification Search
USPC .......... 709/223, 226, 206, 217, 218, 219, 225
See application file for complete search history.

(56) References Cited

U.S. PATENT DOCUMENTS 5,857,190 A * 1/1999 Brown
7,581,158 B2 8/2009 Alstrup et al.
(Continued)

FOREIGN PATENT DOCUMENTS

WO WO-2013188295 A1 12/2013

OTHER PUBLICATIONS

U.S. Appl. No. 13/914,316, Final Office Action mailed Dec. 23, 2013, 8 pgs.
(Continued)

*Primary Examiner* — Liangche A Wang
(74) *Attorney, Agent, or Firm* — Haner & Kuo, PLLC; Erica W. Kuo

(57) ABSTRACT

A method and system to enable remote management of a media content subscription are described. The method includes receiving, at a local point of presence from a consumer, a request to access media content that is available under a media content subscription. The method further includes capturing, at the local point of presence from a consumer, a request to access media content from the local media content provider and transforming the captured media content into a digital stream that is suitable for streaming over a network. Finally, the method includes streaming the digital stream over the network, via which the consumer, using a computer device, accesses the media content.

5 Claims, 9 Drawing Sheets

(51) Int. Cl.
  *H04N 21/2225* (2011.01)
  *H04N 21/2343* (2011.01)
  *H04N 21/2747* (2011.01)
  *H04N 21/472* (2011.01)
  *H04L 12/24* (2006.01)
  *H04N 21/258* (2011.01)
  *H04N 21/61* (2011.01)

(52) U.S. Cl.
  CPC .... *H04N 21/47202* (2013.01); *H04N 21/25841* (2013.01); *H04N 21/6112* (2013.01); *H04N 21/6118* (2013.01); *H04N 21/6125* (2013.01); *H04N 21/6143* (2013.01)

(56) References Cited

U.S. PATENT DOCUMENTS

| | | | |
|---|---|---|---|
| 7,792,756 | B2 | 9/2010 | Plastina et al. |
| 7,882,034 | B2 | 2/2011 | Hug et al. |
| 8,799,390 | B2 | 8/2014 | Subramanian |
| 8,938,543 | B2 | 1/2015 | Subramanian |
| 2006/0095472 | A1 | 5/2006 | Krikorian et al. |
| 2008/0052752 | A1 | 2/2008 | Jeffery |
| 2010/0146527 | A1 | 6/2010 | Craib et al. |
| 2011/0251987 | A1* | 10/2011 | Buchheit .......... 706/46 |
| 2012/0079276 | A1* | 3/2012 | Evans et al. .......... 713/170 |
| 2012/0127374 | A1 | 5/2012 | Kanojia et al. |
| 2012/0200774 | A1* | 8/2012 | Ehlers, Sr. .......... 348/515 |
| 2012/0246240 | A1* | 9/2012 | Hanlon .......... 709/206 |
| 2012/0311642 | A1* | 12/2012 | Ginn et al. .......... 725/62 |
| 2013/0332580 | A1 | 12/2013 | Subramanian |
| 2014/0337481 | A1 | 11/2014 | Subramanian |

OTHER PUBLICATIONS

U.S. Appl. No. 13/914,316, Non Final Office Action mailed Sep. 6, 2013, 9 pgs.
U.S. Appl. No. 13/914,316, Notice of Allowance mailed Apr. 25, 2014, 10 pgs.
U.S. Appl. No. 13/914,316, Reponse filed Mar. 24, 2014 to Final Office Action mailed Dec. 23, 2013, 17 pgs.
U.S. Appl. No. 13/914,316, Response filed Dec. 6, 2013 to Non Final Office Action mailed Sep. 6, 2013, 13 pgs.
U.S. Appl. No. 14/318,209, Notice of Allowance mailed Sep. 15, 2014, 12 pgs.
International Application Serial No. PCT/US2013/044979, International Preliminary Report on Patentability mailed Dec. 24, 2014, 10 pgs.
International Application Serial No. PCT/US2013/044979, International Search Report mailed Aug. 27, 2013, 5 pgs.
International Application Serial No. PCT/US2013/044979, Written Opinion mailed Aug. 27, 2013, 8 pgs.
Todd, Spangler, "Startup NimbleTV to Build Set-Top Farms for Internet TV Play", [Online]. Retrieved from the Internet: <http://www.multi channel.com/content/startup-nimbletv-build-set-top-farms-internet-tv-play>, 3 pgs.

* cited by examiner

REMOTE SUBSCRIPTION MANAGEMENT METHOD AND SYSTEM

RELATED APPLICATIONS

This application is a continuation application which claims the priority benefits of U.S. application Ser. No. 14/318,209, which is a divisional application, filed Jun. 27, 2014, which claims the priority benefits of U.S. application Ser. No. 13/914,316, filed Jun. 10, 2013, which claims the priority benefits of U.S. Provisional Application No. 61/657,911, filed Jun. 11, 2012 which are incorporated in their entirety by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright NimbleTV, Inc. 2013, All Rights Reserved.

TECHNICAL FIELD

The present disclosure relates to a method and system that enable remote management of a media content subscription, such as a cable television or a satellite television subscription.

BACKGROUND

A media market (also known as a broadcast market, media region, or television market area (TMA)) is a geographic region where consumers receive the same (or substantially similar) television and media offerings. In the United States, for example, the Federal Communications Commission (FCC) defines TMAs and uses them to regulate broadcast, cable and satellite transmissions and to delineate local television offerings.

Because media offerings are typically delineated by geographic boundaries, consumers' choice of what media content they can access, as well as how and when to access their media content, have been limited. Over the years, new technologies have given consumers greater control over when and where they can enjoy television programming and other forms of media content. In the 1970's, videocassette recorders (VCRs) were introduced into the mass consumer market. VCRs, and now digital video recorders (DVRs), allow consumers to watch television programs whenever they want, a concept sometimes referred to as time-shifting. With the development of the Internet and more recent advances in video compression and mobile technologies have come the ability to access, from any place in the world accessible to the Internet, the television programs and other media content that consumers receive in one local media market, a concept referred to as place-shifting.

FIG. 1 illustrates one example of place-shifting technology that is currently available to consumers, the Slingbox® (available from Sling Media). As shown in FIG. 1, a cable set-top box 1, which is typically provided by a local cable service provider, is connected to a second set-top box 2, the Slingbox®. Both devices are housed together in one location 5, within the geographic media market serviced by the local cable service provider. A video signal 10 from the cable box 1 is directed to the Slingbox® 2, which transcodes the video signal 10 into MPEG 11 and sends the MPEG signal 11 over the Internet 20 to a remote computer 3. The consumer is thus able to watch television programs available at one location 5 from any location where the remote computer can access the Internet.

One of the disadvantages to existing place-shifting technologies, such as Slingbox®, is that the consumer is required to maintain at least two separate devices, the cable set-top box and the Slingbox®. Moreover, the consumer must also house both devices at a physical location within the particular media market serviced by the local cable service provider. Thus, the consumer must either maintain a residence or physical address within that media market; impose on someone who has a physical address in that media market; or pay a hosting service to physically house and maintain the devices within that media market. If the consumer would like to subscribe to media content from more than one media market, then that consumer would have to maintain a physical presence in each of those media markets and at least two separate devices in each of those media markets.

BRIEF DESCRIPTION OF THE DRAWINGS

For a better understanding of the nature, objects, and processes involved in this disclosure, reference should be made to the detailed description taken in conjunction with the accompanying drawings, in which.

DETAILED DESCRIPTION

Figure 1:
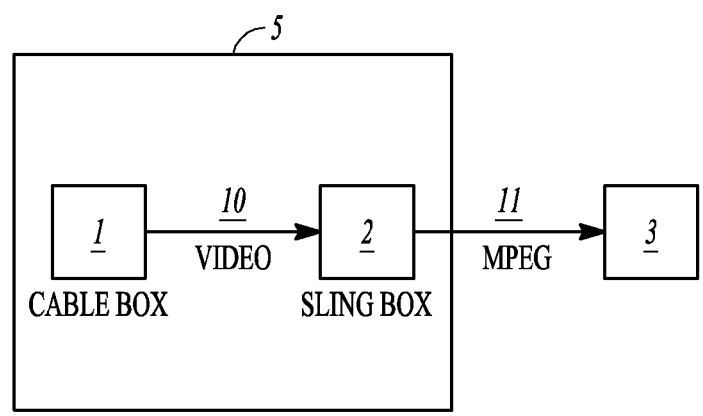
FIG. 1 illustrates an example of prior art place-shifting.

The present disclosure enables consumers to access and manage, from anywhere in the world, a media content subscription from one media market, without requiring the consumer to maintain physical equipment or a physical presence in that media market. The present disclosure further enables consumers to access and manage, from anywhere in the world, media content subscriptions from more than one media market.

Embodiments of the present disclosure provide a method and system for consumers to remotely manage a media content subscription by providing a local point of presence within a media market associated with a local media content provider. The local point of presence provides a consumer with an address within the media market for the consumer to use to subscribe to the media content subscription and to receive media content from the local media content provider. The local point of presence further acts as a local agent through which the consumer can interact with the local media content provider to manage the media content subscription; for example, through the local point of presence, the consumer can receive invoices from the local media content provider and pay subscription fees owed to the local media content provider. Moreover, the consumer can be provided with a local point of presence in more than one media market, so that the consumer can subscribe to and receive media content from multiple media markets and from multiple local media content providers.

The local point of presence includes a plurality of servers located within a media market associated with a local media content provider. The servers are configured to execute computer-programmed instructions for receiving requests from a computing device associated with a consumer. In some embodiments, the request is to access media content that is available to the consumer under the media content subscription provided by the local media content provider; and the servers are further configured to execute, in response to receiving the request, computer-programmed instructions for capturing the media content from the local media content provider, transforming the captured media content into a digital stream that is suitable for streaming over the network, and streaming the digital stream over the network via which the consumer, using the computing device, can access to the media content.

This summary is provided to introduce a selection of concepts within the scope of the present disclosure and is not intended to identify key or essential features of the claimed subject matter. Further details and other features of the present disclosure will be described hereinafter.

With the proliferation of mobile computing devices, consumers are demanding more autonomy over how they enjoy their media content. Many consumers subscribe to media content in a local media market from a local media content provider (such as a cable television provider, satellite television provider, etc.). The local media content provider usually provides a physical piece of hardware (e.g., a set-top box) to the consumer that enables the consumer to access the subscribed-to media content from one device (such as a television set) to which the set-top box is linked. Many consumers, however, want the ability to access that media content subscription using any device (such as a personal computer, a tablet computer, a digital media player, etc.) from anywhere within the local media market or outside of it, at anytime. The present disclosure help meet this demand by enabling consumers to subscribe to, manage and access, from anywhere in the world, media content from a given media market, or from more than one media market.

According to the present disclosure, the consumer is provided a local point of presence within a media market associated with a local media content provider (such as a local broadcast, cable, satellite or direct television provider). The local point of presence enables the consumer to subscribe to, manage and access a media content subscription without having to maintain a physical presence in that media market. The local point of presence provides the consumer with an address within that media market for the consumer to use to subscribe to and to receive media content from a local media content provider, and also to interact with the local media content provider and to manage the media content subscription.

The local point of presence includes a plurality of servers located within that media market. The consumer uses a computing device to interact with the local point of presence via a network, such as the Internet. The servers are configured to execute computer-programmed instructions for receiving requests from a computing device associated with the consumer. In some embodiments, the requests may include a request to set-up an account that would allow the consumer to use the address of the local point of presence to subscribe to a media content subscription from the local media content provider; in some embodiments, the requests may include a request to access media content to which the consumer has previously subscribed using the address of the local point of presence. The servers are further configured to execute, in response to receiving a request to access media content, computer-programmed instructions for capturing the media content (such as television programming, movies, other type of audio and/or video (A/V) content, etc.) that is distributed by the local media content provider and transforming the captured media content into a digital stream (such as an IP-based stream) suitable for streaming over a network, such the Internet. The servers are also configured to execute computer-programmed instructions for streaming the digital stream over the network, enabling the consumer, using the computing device, to access to the media content via the network.

It should be understood that the term "server" is used herein in its broadest sense and is not intended to limit the scope or functionality of any aspect of the present disclosure. Thus, embodiments of the present disclosure may be implemented using any type of computer hardware system environment or configuration. Moreover, a "server" or "servers" or "plurality of servers" being configured to execute computer-programmed instructions is intended to include one or more individual servers that alone or in any combination together execute computer-programmed instructions for carrying out any of the steps or combination of steps according to the present disclosure.

The local media content provider may be a local broadcaster, cable, satellite or direct television provider, etc., and may distribute the media content over the air (OTA), free to air (FTA), or via cable, satellite, direct or any other method presently used to distribute media content to or within a media market. The media content subscription may be a cable television subscription, a satellite television subscription, or the like, and may include an annual subscription, a monthly subscription, packaged or bundled television channels and services, pay-per-view, on-demand, or any type of media content offerings provided by a local media content provider.

The computing device, used by the consumer to send requests to the local point of presence and to access the media content via the network, may be any network- or Internet-enabled device, such as a computer, a laptop, a notebook, a tablet computer, a mobile phone, a portable media player (such as an iPod), a personal digital assistant (PDA), Internet-enabled television, game console, etc. The network, over which the digital stream is streamed and via which the consumer's computing device accesses the media content, preferably includes the Internet. The network may use any network protocol, such as TCP/IP, UDP, RTP, RTSP, etc., or any combination thereof, and may also include a mobile phone network (such as GSM, GPRS, EDGE, etc.), a direct wired connection or wired network, a wireless network (such as WiFi, WiMAX, etc.), a local area network (LAN), a wide area network (WAN) and/or any combination thereof.

In one presently preferred embodiment, the method and system further include the use of a cloud-based server that interacts with the local point of presence via the network. Incorporating the use of a cloud-based server into a method and system according to the present disclosure can facilitate the implementation of time-shifting and place-shifting functionality. The cloud-based server can be configured to execute computer-programmed instructions for receiving the digital stream streamed from the local point of presence and, upon receiving a request to view the media content from the computing device via the local point of presence, streaming the digital stream to the computing device. The cloud-based server also can be configured to execute, in response to a request to record the media content, computer-programmed instructions for storing the digital stream streamed from the local point of presence. In this way, the media content (encoded in digital form) may be stored on the cloud-based server until such time as a request to view the media content is received from the computing device via the local point of presence and the consumer, using the computing device, accesses the digital stream from the cloud-based server. Using a cloud-based server, such as Amazon S3, the consumer would benefit from having access to essentially unlimited storage for his/her subscribed-to media content.

Figure 2:
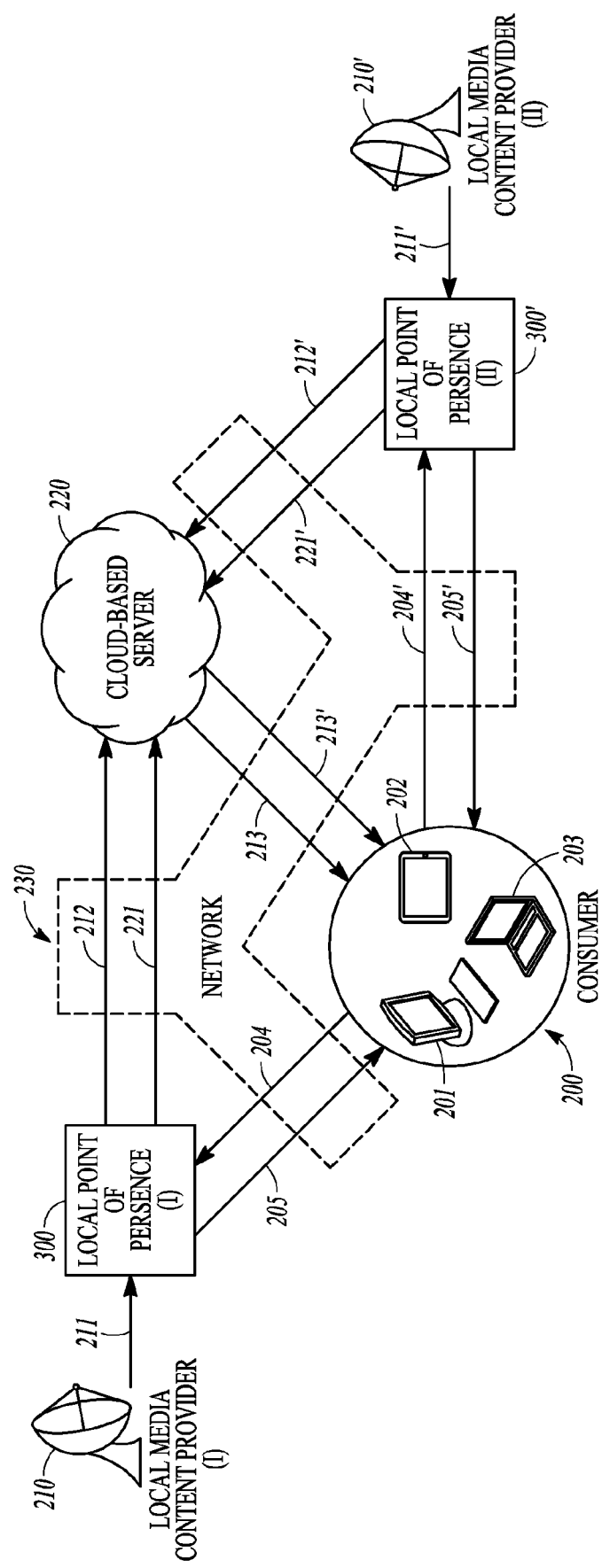
FIG. 2 illustrates one embodiment of a system that enables consumers to remotely manage a media subscription according to the present disclosure.

FIG. 2 illustrates one implementation of this presently preferred embodiment. As shown in the FIG. 2, a first local point of presence (I) 300, located in a first media market, serves to coordinate requests and information (represented by arrows 204, 205) to and from a consumer 200 and to direct media content (represented by arrow 211, 212, 213) from a first local media content provider (I) 210 via a cloud-based server 220 to the consumer 200. The consumer 200 uses a computing device 201, 202, or 203 to interact with the first local point of presence (I) 300 and access media content via the cloud-based server 220. The first local point of presence (I) 300, consumer 200, and cloud-based server 220 interact with one another via a network 230.

The local point of presence 300 and consumer 200 communicate back and forth 204, 205 so that the consumer can set-up an account with the local point of presence, subscribe to a media content subscription with a local media content provider, access media content from the local media content provider and also manage a media content subscription. A request to access media content from the local media content provider may include a request to view, listen, record, etc. media content which is available under a media content subscription to which the consumer has previously subscribed. Managing the media content subscription may include renewing the subscription, paying subscription fees, altering the subscription, subscribing to additional services, editing a user profile, and the like, as well as viewing media content, recording media content, setting recording schedules, commenting on social networks, etc.

In order to direct media content to the consumer, the first local point of presence (I) 300 first captures the media content 211 (e.g., such as television programming, movies, other types of audio and/or video (A/V) content, etc.) from the first local media content provider (I) 210 (shown in FIG. 2 as a satellite dish receiver). The media content captured at the local point of presence is typically in the form of an A/V signal. At the local point of presence, the audio and/or video components of the captured media content may be digitized and compressed to form a digital stream 212 suitable for streaming over the network 230. The present disclosure may be implemented using any means for digitizing an audio or a video signal and any means for compressing a digital signal. Thus, the present disclosure is not limited in any way by streaming format or by network, transport or control protocol.

In the embodiment illustrated in FIG. 2, the first local point of presence (I) 300 streams the digital stream 212 encoding the media content to a cloud-based server 220, and the consumer 200 accesses the media content from the cloud-based server (as represented by arrow 213) via the network 230. In addition to streaming the digital stream 212 that encodes the media content to the cloud-based server, the local point of presence transmits instructions 221 to the cloud-based server for how to handle the digital stream 212. For example, the cloud-based server may be instructed to immediately re-stream the digital stream encoding the media content to the consumer, or may be instructed store the digital stream or, at a later time, stream the stored digital stream encoding the media content to the consumer.

The system described above may be replicated in multiple media markets. As shown in FIG. 2, a second local point of presence (II) 300' is located in a second media market and serves to coordinate requests and information to and from the consumer 200 and to direct media content from a second local media content provider (II) 210' via the cloud-based server to the consumer 200. The parts labeled with primed numbers have substantially similar functionality as the parts labeled with the corresponding unprimed numbers and discussed above. In this way, embodiments of the present disclosure allow a consumer to subscribe to and manage media content subscriptions from multiple local media content providers and to access media content from multiple media markets.

Figure 3:
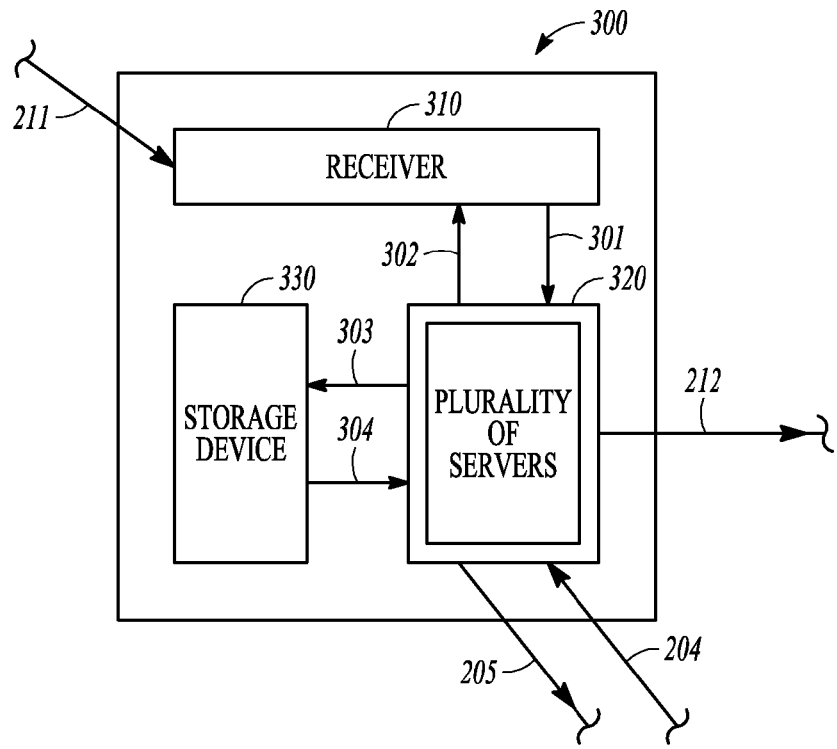
FIG. 3 illustrates one embodiment of a local point of presence according to the present disclosure.

FIG. 3 illustrates one possible implementation of a local point of presence. In this example, the local point of presence 300 includes a receiver 310, a plurality of servers 320 and a storage device 330.

The receiver 310 maybe any device capable of receiving a signal carrying the media content 211 from a local media content provider and outputting an A/V signal 301 that carries the media content. For example, the receiver may be a set-top box that is typically provided by a local media content provider. The receiver 310 also may decode, convert and/or enhance the signal received from the local media content provider.

The plurality of servers 320 are configured to execute computer-programmed instructions for receiving the media content in the form of an A/V signal 301 and transforming the captured media content into a digital stream 212 (as described previously). The plurality of servers may also be configured to execute computer-programmed instructions for sending commands 302 to the receiver 310 and for interacting with a computing device (as shown by arrows 204, 205) and with the storage device 330 (as shown by arrows 303, 304) so that the consumer may manage the media content subscription and access the media content.

The storage device 330 may be any form of computer readable media and may be used to store user profile information (e.g., name, address, age, and the like, as well as setting preferences, favorite television shows, etc.), subscription information (e.g., local media content provider, subscribed-to channels, type of subscription, renewal date, etc.), account information (e.g., payment status, credit card or debit card or bank account information, etc.), and other type of information and/or data (including metadata) which may be useful for carrying out steps according to certain embodiments of the present disclosure.

The local point of presence may be configured in any number of ways depending on the demands of a particular media market. For example, in some media markets, it may be more practicable to have a dedicated receiver per each consumer, where the A/V signal from each set-top box is transformed into a digital stream that is streamed via the cloud-based server and accessible only by the consumer associated with that set-top box. In other media markets, it may be more practicable to have one receiver dedicated to one television channel, where the A/V signal from one receiver is transformed into one digital stream that is streamed to the cloud-based server from where multiple digital streams may be streamed to multiple consumers. It will be clear to one of ordinary skill in the art that numerous other configurations may be implemented and are within the scope of the present disclosure.

Using embodiments of the present disclosure, consumers are able to manage their media content subscriptions from any location in the world accessible to the Internet. FIGS. 4A-4G illustrate some aspects of one implementation of how a consumer would access media content according to one embodiment of the present disclosure. The system illustrated in the example shown in FIGS. 4A-4G is called NimbleTV®.

Figure 4A:
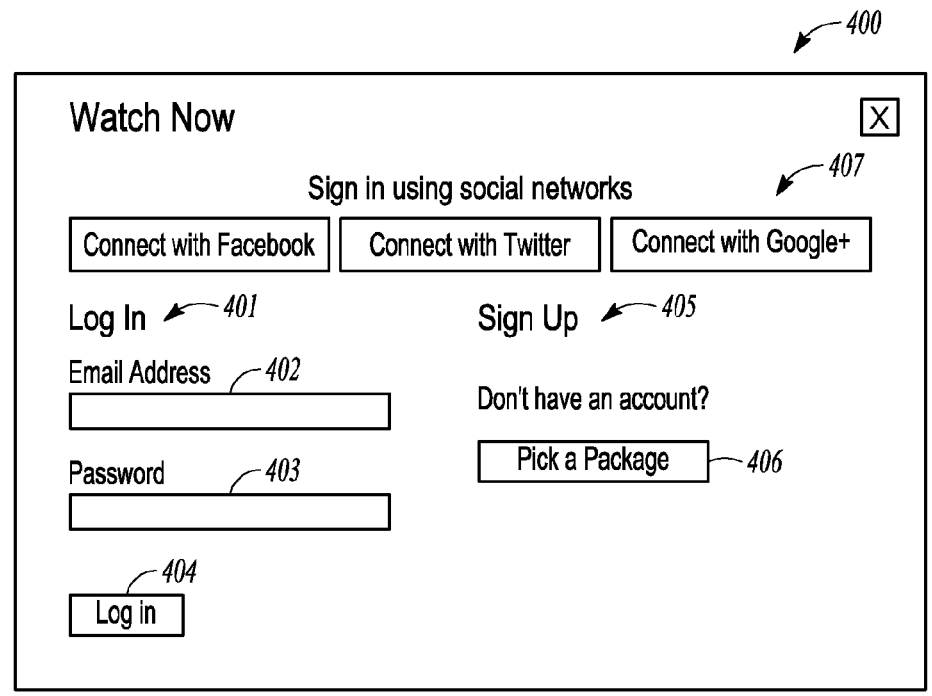
FIGS. 4A-4G illustrate some aspects of an embodiment of a method that enables consumers to remotely manage a media subscription according to the present disclosure.

Using any Internet-enabled computer device, the consumer would access a user interface page 400, as shown in FIG. 4A, to log in or sign up to use one embodiment of a system according to the present disclosure. If the consumer does not have an account with the system, then that consumer would sign up 405 by first hitting the "Pick a Package" button 406. After the "Pick a Package" button, the consumer would be presented with a page 410 as shown in FIG. 4B, where the consumer would begin to browse for a media content subscription.

Figure 5:
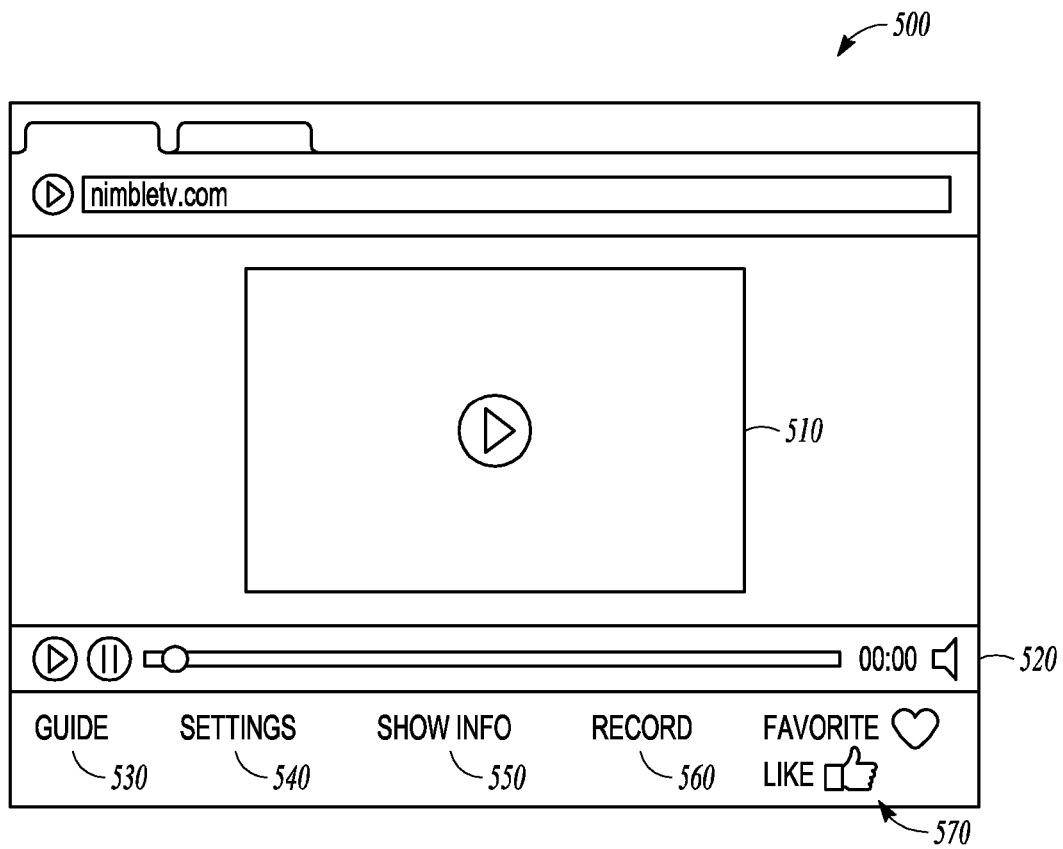
FIG. 5 shows a screen shot of a media player that may be used by a consumer's computing device to view media content using embodiments according to the present disclosure.

If the consumer already has an account with the system, then that consumer would log in 401 by entering his/her email address 402 and password 403 and then hitting the "Log In" button 404. Alternatively, the consumer may choose to sign in via a social network, such as Facebook®, Twitter®, or Google+®, as shown at 407. In some embodiments, after logging in or signing in, the consumer would be presented with a page such as shown in FIG. 5, which is discussed below. In other embodiments, after logging in or signing in, the consumer would be presented with a page 410 such as shown in FIG. 4B, in order to add a media content subscription and/or services to his/her account, or perhaps to modify an existing media content subscription.

Figure 4B:
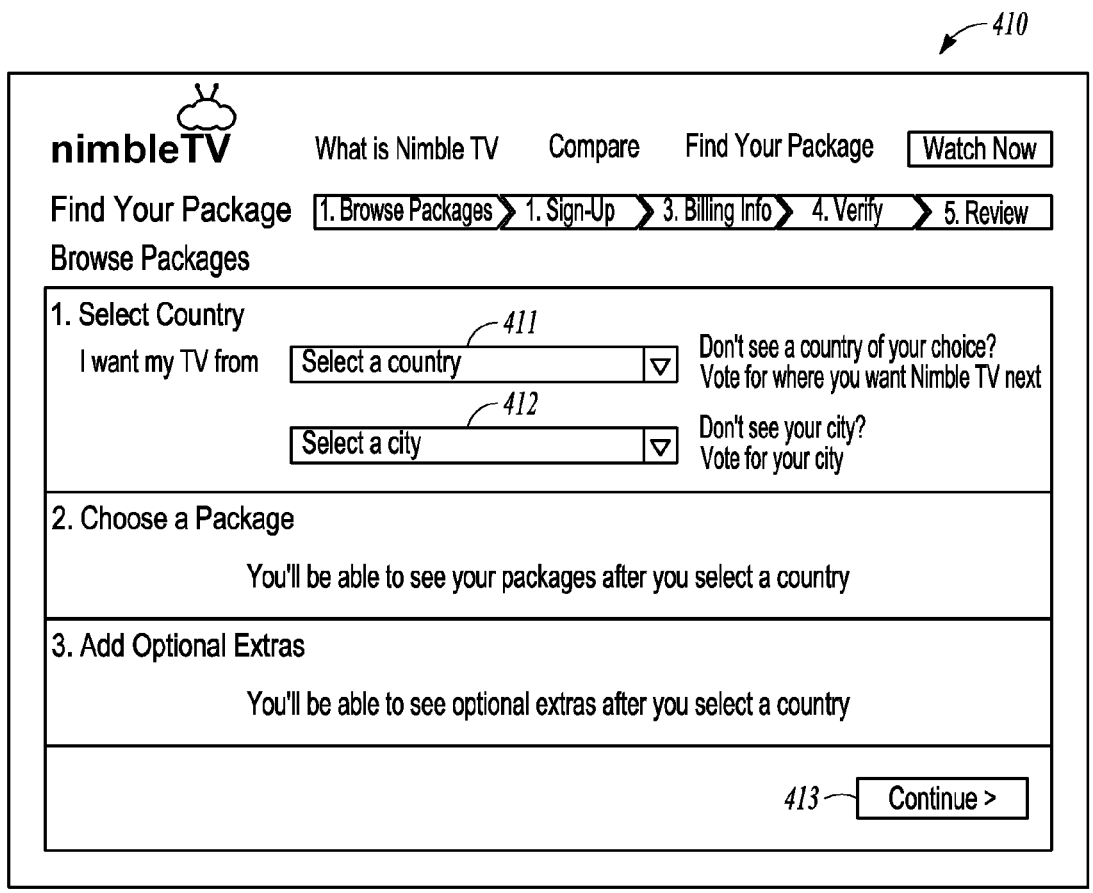

The page 410 as shown in FIG. 4B may be used to display available media content subscriptions (or "Packages"). As media content subscriptions are typically delineated by geographic media market, the page 410 in this example is set up to browse media content subscriptions by first selecting a country 411 and then a city 412.

Figure 4C:

After selecting a country and city and hitting the "Continue" button 413, a page 420 as shown in FIG. 4C would be displayed. In the example illustrated, the United States was selected as the country 421 and New York as the city 422. In the section 423 below the country and city is shown the available packages (media content subscriptions). As shown, the available packages may be displayed using various filters (e.g., monthly subscriptions, annual subscriptions, providers, features). The consumer is also given the ability to compare selected plans 424 and view channels included in a package 425. Additional services, as shown in the following section 426, such as DVR options and premium television channels, may be added to the subscription as well.

Figure 4D:
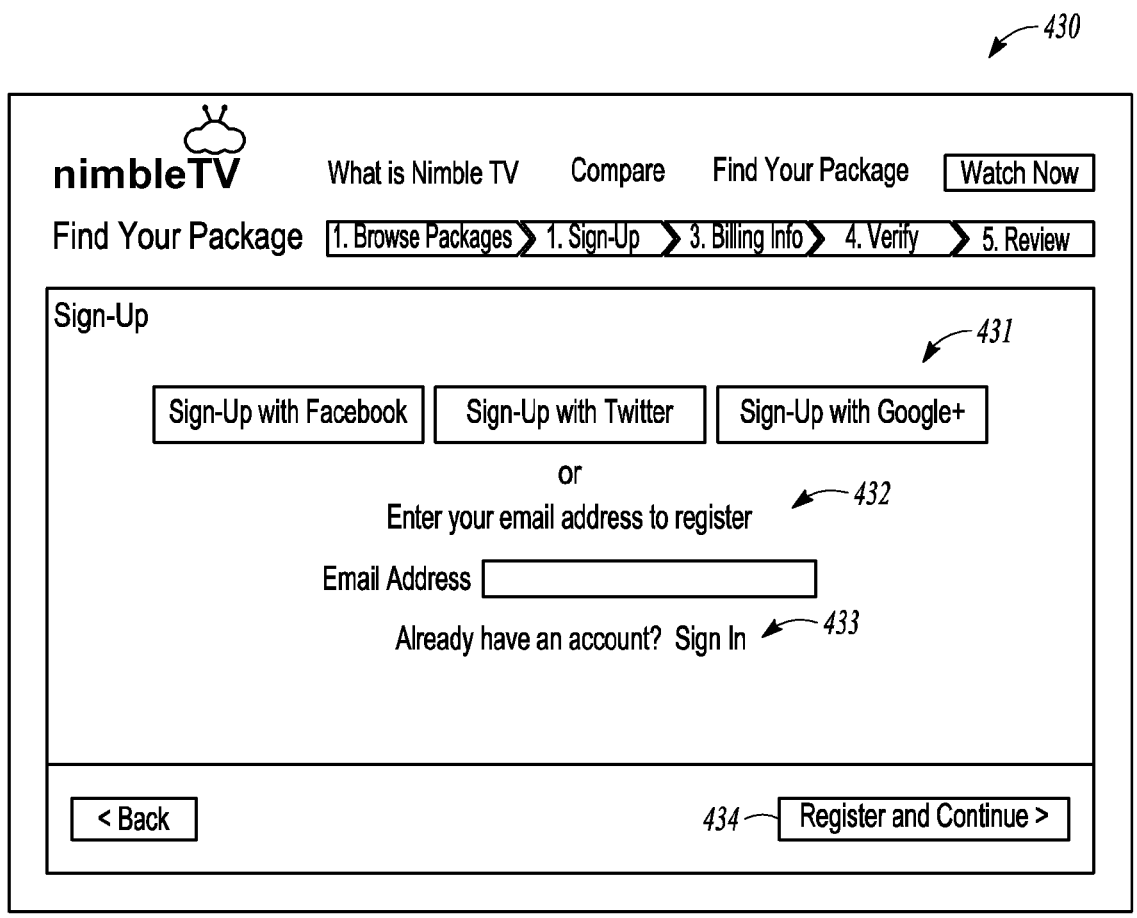

After selecting the package and services and hitting the "Continue" button 427, the consumer would be presented with a registration page 430, such as shown in FIG. 4D, to set-up an account with the system, called NimbleTV® in this example. The consumer may sign up via a social network, such as Facebook®, Twitter®, or Google+®, as shown at 431, or by entering his/her email address 432 and then hitting the "Register and Continue" button 434. In some embodiments, by hitting "Register and Continue" 434 or signing-up via a social network 431, the consumer creates a user profile and/or an account that is stored in a storage device associated with the system. By setting up the account with the system, the consumer is allowed to use the address of the local point of presence located in the media market of the selected subscription; as described previously, the consumer uses the address of the local point of presence to subscribe to the media content subscription and to receive media content from the local media content provider.

Figure 4E:
Figure 4F:

After registering or signing-in, the consumer may be presented with a page 440, as shown in FIG. 4E, via which the consumer may enter billing and payment information, such as credit card type, number, expiration date, etc. 441. After entering the requested billing information and hitting the "Continue" button 442, the consumer may be presented with a page 450, as shown in FIG. 4F, that summarizes the consumer's media content subscription and total cost 451. As discussed previously, one of the advantages of a method and system according to the present disclosure is the ability to subscribe to media content subscriptions from more than one media market. The page 450 includes a link that allows the consumer to "Add another package" 452. Hitting the "Add another package" link 452 may return the consumer to a page 410 such as shown in FIG. 4B, and the consumer may then repeat the steps described above with reference to FIGS. 4B-4C before being returned to a page 450 such as shown in FIG. 4F.

When the consumer has finalized his/her media content subscription(s) and services order(s), the consumer hits the "Subscribe Now" button 453. By hitting the "Subscribe Now" button 453, the consumer authorizes the local point of presence to submit the subscription order on his/her behalf, using the address of the local point of presence, to the local media content provider of the selected media subscription and/or services. If more than one media content subscription is ordered, each subscription order is routed through the local point of presence located in the relevant media market. In other words, an order for a first media content subscription from a first local media content provider in a first media market would be routed through a first local point of presence located in that first media market, using the address of that first local point of presence in that first media market; an order for a second media content subscription from a second local media content provider in a second media market would be routed through a second local point of presence located in that second media market, using the address of that second local point of presence in that second media market; and so on. From the consumer's point of view, the routing of different orders to different local media content providers using different addresses would happen seamlessly, with a single push of the "Subscribe Now" button 453.

Figure 4G:
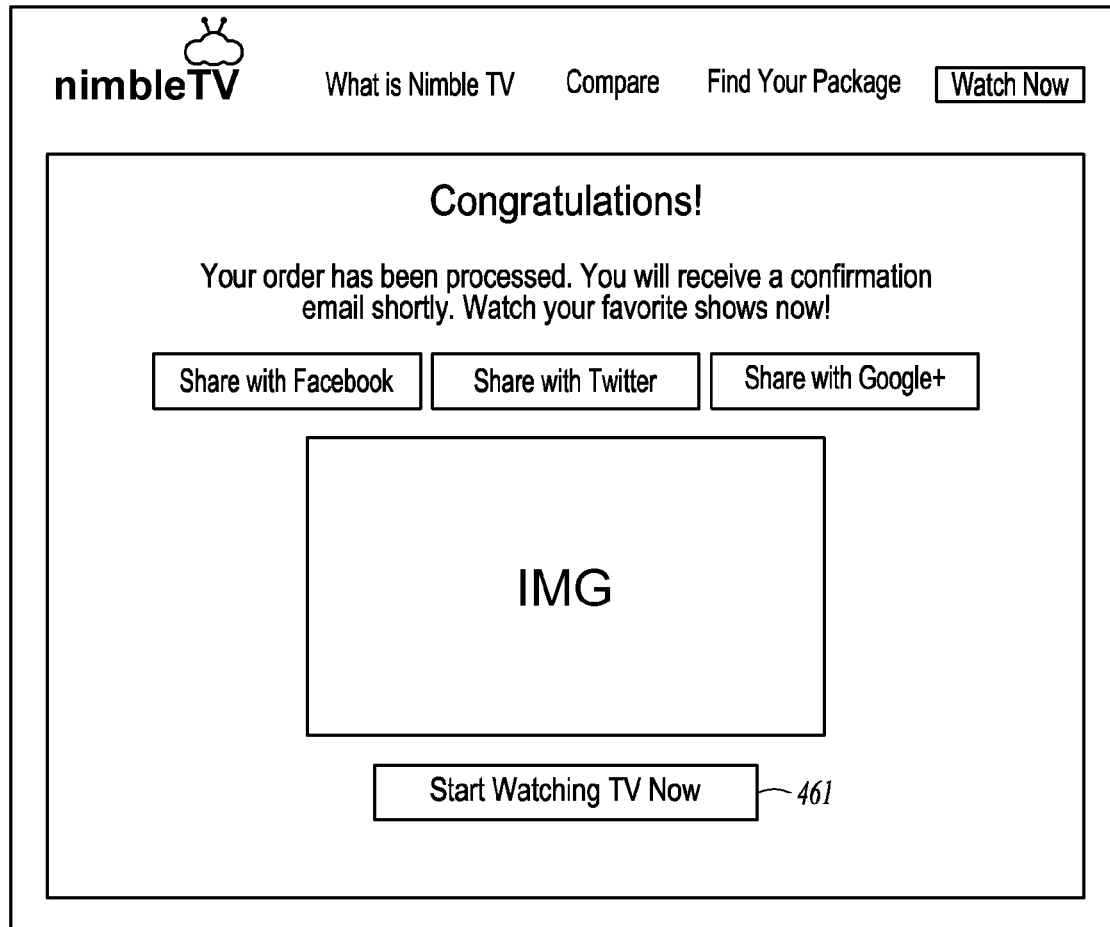

After the order is processed by the relevant local media content provider(s), the consumer is presented with a confirmation page 460, as shown in FIG. 4G, and the consumer is ready to access and view media content that is available under the media content subscription(s) just ordered 461.

FIG. 5 shows one example of how media content may be viewed on the consumer's computing device. FIG. 5 shows a screen shot 500 of a media player that the consumer's computing device may use to display the requested media content. The requested media content would be displayed in a view area 510. In addition to displaying the media content for the consumer to view, the computing device may display various other features which allow the consumer to interact with the system and customize his/her media viewing experience, features such as audio/video controls 520 (play, pause, volume, etc.), a program guide 530, setting controls 540, show information 550, record control 560 and social networking features 570. In some embodiments of the present disclosure, certain of the consumer's interactions with the system while viewing media content may be stored in his/her user profile.

The operations described herein may be performed in any order, unless otherwise specified, and embodiments of the disclosure may include additional or fewer operations than those disclosed herein. Moreover, when one element or step is described as being responsive to another element or step, it will be understood that the elements or steps may be coupled directly or indirectly.

It will be further understood that the articles "a", "an", "the" and "said" are intended to mean that there may be one or more of the elements or steps present. The terms "comprising", "including" and "having" are intended to be inclusive and mean that there may be additional elements or steps other than those expressly listed.

The foregoing description has been presented for the purpose of illustrating certain aspects of the present disclosure and is not intended to limit the disclosure. Persons skilled in the relevant art will appreciate that many additions, modifications, variations and improvements may be implemented in light of the above teachings and still fall within the scope of the present disclosure.

I claim:

1. A method of remotely accessing a media content subscription that is provided within a local media market by a local media content provider, the method being practiced by a consumer using a computing device to interact via a network with a local point of presence, the local point of presence comprising a plurality of servers located within the local media market in which the local media content provider provides the media content subscription, the method comprising the steps of:
    transmitting, from the computing device to the plurality of servers via the network, a request to access media content that is available to the consumer under the media content subscription that is subscribed to by the consumer, the plurality of servers being configured to execute computer-programmed instructions to:
        receive the request to access media content;
        responsive to the request to access media content, capture media content from the local media content provider;
        transform the captured media content into a digital stream, the digital stream being suitable to stream over the network; and
        stream the digital stream over the network; and
    receiving the digital stream at the computing device via the network.

2. The method of claim 1, further comprising:
    transmitting, from the computing device to the plurality of servers via the network, a request to record the media content, the servers being connected to a cloud-based server via the network and the cloud-based server being configured to execute computer-programmed instructions to receive the di al stream from the local point of presence via the network and to store the digital stream from the local point of presence.

3. The method of claim 2, wherein the computing device receives the digital stream from the cloud-based server via the network.

4. The method of claim 1, wherein the network includes the Internet.

5. A machine-readable device storing instructions that, when executed by at least one processor in a computing device associated with a consumer, cause the at least one processor to perform the following actions:
    transmitting, from the computing device to a local point of presence via a network, a request to access media content that is available to the consumer under a media content subscription that is provided within a local media market by a local media content provider and subscribed to by the consumer, the local point of presence comprising a plurality of servers located within the local media market in which the local media content provider provides the media content subscription, the plurality of servers being configured to execute computer-programmed instructions to:
        receive the request to access media content;
        responsive to the request to access media content, capture media content from the local media content provider;
        transform the captured media content into a digital stream, the digital stream being suitable to stream over the network; and
        stream the digital stream over the network; and
    receiving the digital stream at the computing device via the network.

* * * * *

UNITED STATES PATENT AND TRADEMARK OFFICE
CERTIFICATE OF CORRECTION

| | | |
|---|---|---|
| PATENT NO. | : 9,241,021 B2 | Page 1 of 1 |
| APPLICATION NO. | : 14/593975 | |
| DATED | : January 19, 2016 | |
| INVENTOR(S) | : Anand Subramanian | |

It is certified that error appears in the above-identified patent and that said Letters Patent is hereby corrected as shown below:

Specification

At column 2, line 1: replace "the Internet 20 to" with -- the Internet to --

At column 3, line 18: replace "can access to the" with -- can access the --

At column 3, line 39: replace "present disclosure help meet" with -- present disclosure helps meet --

At column 5, line 65: replace "may be instructed store" with -- may be instructed to store --

Claims

At column 10, line 7 (in claim 2): replace "to receive the di al stream" with -- to receive the digital stream --

Signed and Sealed this
Twenty-eighth Day of June, 2016

Michelle K. Lee
*Director of the United States Patent and Trademark Office*